United States Patent [19]
Rumsey

[11] Patent Number: 4,830,437
[45] Date of Patent: May 16, 1989

[54] BRAKE ASSURANCE CIRCUIT TO PRESERVE PROPER LOCOMOTIVE OPERTING STATUS

[75] Inventor: Steven C. Rumsey, Greer, S.C.

[73] Assignee: American Standard Inc., Spartanburg, S.C.

[21] Appl. No.: 172,836

[22] Filed: Mar. 25, 1988

[51] Int. Cl.⁴ .................. B60T 15/14; B60T 7/10; B60T 7/12

[52] U.S. Cl. .................. 303/18; 303/15; 303/67; 303/101; 188/156

[58] Field of Search .............. 303/3, 15–20, 303/67, 86, 91, 100, 101; 188/107, 156; 246/189

[56] References Cited

U.S. PATENT DOCUMENTS

| | | | |
|---|---|---|---|
| 2,068,340 | 1/1937 | Logan, Jr. | 303/15 X |
| 2,860,928 | 11/1958 | Gorman | 303/18 |
| 3,893,698 | 7/1975 | Fontaine | 303/18 X |
| 3,901,558 | 8/1975 | Burckett | 303/16 |
| 4,165,136 | 8/1979 | Erlbeck | 303/19 |
| 4,491,372 | 1/1985 | Walley | 303/18 |
| 4,626,039 | 12/1986 | Worbois | 303/19 |

OTHER PUBLICATIONS

Wabco "26-L", Locomotive Air Brake, *Equipment and Devices*; Westinghouse Air Brake Division, American Standard Inc., Jan. 1988.

*Primary Examiner*—Andres Kashnikow
*Assistant Examiner*—Timothy Newholm
*Attorney, Agent, or Firm*—G. J. Falce

[57] ABSTRACT

A brake assurance circuit via which a magnet valve device is deenergized to exhaust brake pipe pressure independently of the locomotive brake valve device in order to apply braking any time the proper operating status of the locomotive brake valve is changed after the locomotive is underway. A pressure switch responsive to the cut-in and cut-out setting of the manual selector valve associated with the brake valve senses the locomotive status and connects one of two possible circuits to the magnet valve device in parallel with a primary circuit having a speed responsive switch. Once locomotive movement is underway, the primary circuit drops out and the effective circuits selected by the pressure switch maintains the magnet valve energized provided the selected pressure switch setting is not changed. Should the pressure switch setting be changed, all power is cut off from the magnet valve and cannot be reapplied until the locomotive comes to a complete halt to allow the speed responsive switch to reset and restore power via the primary circuit.

16 Claims, 1 Drawing Sheet

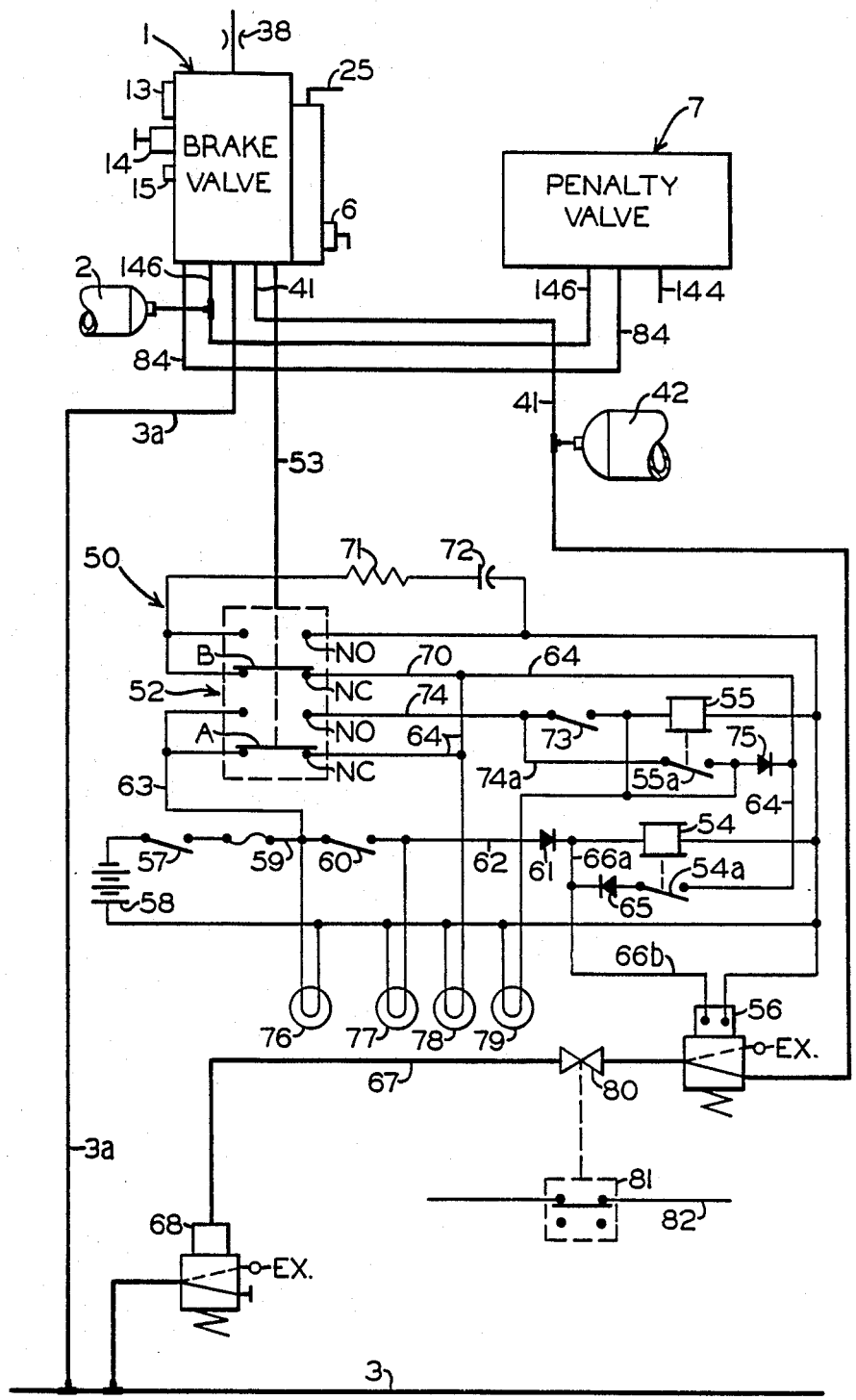

BRAKE ASSURANCE CIRCUIT TO PRESERVE PROPER LOCOMOTIVE OPERTING STATUS

BACKGROUND OF THE INVENTION

The present invention relates to railway locomotive brake control apparatus and particularly to such apparatus as affords the locomotive engineer the ability to selectively cut in or cut out the locomotive brake valve device.

One well-known locomotive brake valve device is the standard 26-C brake valve shown in Westinghouse Air Brake Co. instruction pamphlet G-g-5071-6. Basically, this brake valve device includes a regulating valve through which equalizing reservoir pressure is controlled by manipulation of the automatic brake valve handle and a relay valve that in turn controls the supply and exhaust of pneumatic pressure carried in the train brake pipe according to the effective equalizing reservoir pressure. In addition, there is further provided a manual selector valve having a cut-in position and a cut-out position, and a brake pipe cut-off valve, the latter of which can be conditioned to interrupt the supply and exhaust of brake pipe pressure by manually setting the selector valve in cut-out position. This permits the locomotive brake valve device to be disabled or cut out, by isolating it from the brake pipe, for the purpose of conducting brake pipe leakage tests, for multiple-unit operation, for hauling a locomotive "dead," for double-heading operation, etc.

Such an arrangement has given rise to an unauthorized operating procedure being employed by locomotive engineers during train movement, in which the selector valve is improperly moved to cut-out position to avoid a penalty brake application on trains having automatic safety control, overspeed and train control penalty systems. Manipulating the selector valve in such an unauthorized manner, in effect, disables the brake valve device.

Thus, an extremely dangerous situation is created not only from the standpoint of having the various safety protection systems ineffective due to the inability to achieve a penalty brake application, but also from the standpoint of having the normal operator control of the train brakes through the brake valve device ineffective during the time the selector valve is in cut-out position.

SUMMARY OF THE INVENTION

The object of the present invention is to provide a brake assurance circuit for automatically initiating an emergency brake application throughout the train any time the selector valve is repositioned during train movement from its proper position in which the selector valve was set prior to train movement.

It is another object of the invention to prevent the release of an emergency brake application initiated by the brake assurance circuit until the train has come to a complete halt.

Another object of the invention is to provide a means for manually releasing an emergency brake application initiated by the brake assurance circuit in the event the brake application occurs as a result of a system malfunction.

It is a final object of the invention to disable the propulsion control system any time an emergency brake application initiated by the brake assurance circuit is manually released.

In achieving these objectives, briefly, there is provided a brake assurance circuit via which power is normally connected to a magnet valve device that effects venting of brake pipe pressure independently of the locomotive brake valve device any time the magnet valve is deenergized. A first circuit normally conducts current to the magnet valve via a speed responsive switch, while concurrntly a pressure switch conducts current to the magnet valve device via a second circuit in parallel with the first circuit, provided the manually operable selector valve of a conventional locomotive brake valve device is not repositioned during locomotive movement from its proper setting, in which it is positioned prior to movement, and during which movement the current flow to the magnet valve device via the first circuit is cut off by the speed responsive switch.

BRIEF DESCRIPTION OF THE DRAWING

The foregoing objectives and other objects and advantages of the present invention will be apparent from the following more detailed explanation when taken in conjunction with the single FIGURE drawing showing a schematic representation of the invention.

DESCRIPTION AND OPERATION

A conventional engineer's brake valve device 1 includes a selector valve 6, a relay valve 13, a regulating valve 14, and a brake pipe cut-off valve 15, all of which operate in the usual, well-known manner, as explained hereinafter. A main reservoir 42 is maintained charged by the locomotive air compressor (not shown). Compressed air is connected from main reservoir 42 via a pipe 41 leading to brake valve device 1, where this pressure is adjusted to the desired setting by regulating valve 14, in accordance with the position of the brake valve handle 25. Air at this adjusted pressure is, in turn, connected to a pipe 84 leading from brake valve device 1 to a penalty application valve device 7. A spool valve (not shown) normally connects this air from the penalty application valve 7 to a pipe 146 leading to an equalizing reservoir 2, and thence to the brake valve relay valve 13. Also connected to relay valve 13 via a branch pipe 3a is the air carried in brake pipe 3. Relay valve 13 is operative in response to the equalizing reservoir/brake pipe pressure differential to either supply pressure to the brake pipe 3 from main reservoir 42, or to exhaust pressure from brake pipe 3 to atmosphere via an exhaust choke 38, depending upon whether the equalizing reservoir pressure is greater or less than the effective brake pipe pressure.

Selector valve 6 may be manually set to a cut-in or a cut-out position. In cut-out position, the selector valve connects main reservoir pressure from pipe 41 to the control chamber of the brake pipe cut-off valve 15, which is accordingly operated to its closed position to interrupt the flow of air between brake pipe 3 and relay valve 13. Consequently, brake valve device 1 is incapable of varying brake pipe pressure in either a positive or negative direction, and the brake valve device is said to be "cut out" of service.

In cut-in position of the selector valve, the control chamber of the brake pipe cut-off valve is vented to atmosphere, thus permitting the cut-off valve to assume its normal open position in which air flow is established between brake pipe 3 and relay valve 13. Consequently, brake valve device 1 is capable of varying brake pipe pressure in accordance with the selected position of handle 25, and the brake valve is said to be "cut in."

Penalty application valve device 7 operates to initiate a penalty brake application whenever an unsafe operation condition exists, such as, failure of the operator to periodically acknowledge his alertness, or when an overspeed condition of the train or traction motors is detected. When one of the foregoing unsafe operating conditions is detected, penalty application valve device 7 connects equalizing reservoir pressure to a reduction limiting reservoir, not shown, or to atmosphere via pipe 144, whereby the equalizing reservoir pressure, and, consequently, the train brake pipe pressure is reduced to initiate the penalty brake application.

A brake assurance circuit 50 includes a pressure switch 52 which is connected to a control pipe 53 leading to brake valve device 1, a pair of electrical relays 54, 55, and a two-position, three-way, solenoid-operated, spring-returned magnet valve 56. Pressure switch 52 includes a pair of ganged movable switch arms A, B, each having a normally closed set of fixed contacts NC and a normally open set of fixed contacts NO.

An operator-controlled on/off switch 57 is provided to connect a source of power, as from the vehicle battery 58, to input wire 59, in order to activate the brake assurance circuit.

Assuming the locomotive having this brake assurance circuit is operating in a "lead" mode, the selector valve 6 is set to cut-in position, thereby venting control pipe 53 and accordingly conditioning the brake valve device 1 to effect variations in the brake pipe pressure, either under operator control by manipulation of handle 25 or under automatic control, in response to operation of penalty valve 7. With control pipe 53 vented, pressure switch 52 is positioned, as shown, with movable switch arms A, B engaging their normally closed contacts NC.

Prior to movement of the locomotive, a normally closed velocity switch 60 connects power from battery 58 to relay 54 via a diode 61 and wire 62. Energization of relay 54 picks up the relay contact 54a. This establishes an auxiliary path for energizing relay 54 via wire 63, the normally closed contact A of pressure switch 52, a wire 64, closed relay contact 54a, a blocking diode 65, and wire 66a, in bypass of velocity switch 60.

Consequently, the solenoid operator of magnet valve 56 is energized prior to train movement via two parallel paths, one via pressure switch 52, wire 64, the closed relay contact 54a, diode 65 and a wire 66b, and the other via velocity switch 60, wire 62, and diode 61. In the energized condition, magnet valve 56 is positioned to close an exhaust port EX via which the exhaust of compressed air in an application pipe 67 is cut off and to connect air from main reservoir 42 to application pipe 67. The pressure in application pipe 67 pilots an exhaust relay valve 68 to a position in which the air carried in the train brake pipe 3 is cut off from atmosphere via port EX.

Concurrently, a branch wire 70 of wire 64 connects power to an r-c timing network comprising a resistor 71 and capacitor 72 via the normally closed contact B of pressure switch 52, for a purpose hereinafter explained.

With selector valve 6 in cut-in position as, for example, when the locomotive is operating as a "lead" or controlling unit, contact A of pressure switch 52 is disengaged from its normally open contact NO, thereby cutting off power from wire 63 to relay 55 via another normally closed velocity switch 73 and a wire 74. A blocking diode 75 is provided in an auxiliary circuit having a normally open contact 55a of relay 55 in parallel with velocity switch 73, and a branch wire 74a of wire 74 which is connected to wire 64.

With penalty brake assurance circuit 50 conditioned, as explained, the normal train terminal tests may be conducted prior to movement of the locomotive without affecting the status of the brake assurance circuit and particularly magnet valve 56. Once train movement is underway, normally closed velocity switches 60 and 73 open, thereby interrupting current to relay 54 via wire 62 and interrupting current to relay 55 via wire 74. However, since relay 54 is latched in through its switch 54a, the relay 54 remains energized to maintain magnet valve 56 energized. Consequently, application pipe 67 is cut off from atmosphere and is thus supplied with main reservoir air to maintain exhaust relay 68 closed. The pressure in brake pipe 3 is thus under control of brake valve 1 without any influence from brake assurance circuit 50, provided the proper locomotive operating status is preserved with regard to the setting of selector switch 6.

In the event the locomotive operator attempts to improperly switch selector valve 6 from its cut-in position to cut-out position during locomotive movement as, for example, to override an impending penalty brake application through penalty application valve 7, control pipe 53 becomes pressurized. Pressure switch 52, therefore, switches to its other position in which the normally open and normally closed contacts of switches A and B are reversed from that shown. This results in the power supplied to wire 64 via the normally closed contacts A of pressure switch 52 being cut off, thus deenergizing relay 54. Since velocity switch 73 is open during locomotive movement, the transfer of power to wire 74 via the normally open contacts A of pressure switch 52 is cut off from relay 55, which, therefore, remains deenergized. With both relays 54 and 55 now deenergized, their respective contacts 54a, 55a drop out to interrupt the power supplied to magnet valve 56 via the relay auxiliary circuits. Accordingly, magnet valve 56 is deenergized to allow its spring operator to switch the pneumatic valve porting and thereby vent application pipe 67 via port EX. This, in turn, pilots exhaust relay 68 to vent the pneumatic pressure in brake pipe 3 via port EX and thereby effect an emergency brake application independently of the cut-out brake brake valve device 1. Consequently, any attempt on the part of the operator to suppress a penalty brake application by improperly switching the train operating status by manipulating selector valve 6 to cut out the brake valve is ineffective, since brake assurance circuit 50 responds to such improper action to effect an emergency brake application in bypass of the cut-out brake valve device 1.

It will also be noted, at this point, that the transition of contact B of pressure switch 52 concurrently with transition of contact A shorts out the r-c network to discharge capacitor 72.

Since velocity switch 60 remains open until locomotive movement is completely halted, it will be appreciated that even though selector valve 6 may be re-set to its proper cut-in position prior to the locomotive stopping, brake pipe 3 cannot be recharged to release the emergency brake application. This is due to the fact that the supply of power to wire 64 via the normally closed contact A of pressure switch 52 is interrupted from magnet valve 56 by switch 54a of relay 54, which remains deenergized until velocity switch 60 closes.

When locomotive movement is completely halted, velocity switch 60 closes to energize magnet valve 56 via wire 62, diode 61, wire 66a, and wire 66b. In the energized state, magnet valve 56 interrupts the brake pipe connection to exhaust port EX and establishes the connection between main reservoir 42 and application pipe 67, so that repressurization of application pipe 67 can take place. This, in turn, pilots exhaust relay 68 to cut off the venting of brake pipe 3, so that brake pipe charging and consequent release of the emergency brake application imposed by brake assurance circuit 50 can be accomplished. Now when selector valve 6 is reset to cut-in position, the brake assurance circuit 50 is conditioned to maintain magnet valve 56 energized, as previously explained, preparatory to train movement.

When the locomotive is operating in a "trail" or "dead" mode, brake valve 1 is disabled by setting the selector valve 6 to cut-out position, in which position pipe 53 is pressurized to operate the brake pipe cut-off valve 15 of brake valve 1 to interrupt charging and venting of brake pipe pressure by the brake valve device.

Closure of on/off switch 57 connects power via wire 59, velocity switch 60, wire 62, and diode 61 to energize relay 54 and thereby effect closure of the relay contact 54a. Due to pressurization of pipe 53, pressure switch 52 closes its normally open contacts NO switches A and B, thereby connecting power via wires 59, 63, the normally open contacts A, wire 74 and velocity switch 73 to energize relay 55 concurrently with relay 54. This causes relay contact 55a to pick up, connecting power from wire 74 to magnet valve 56 via wire 74a, the closed relay contact 55a, diode 75, wire 64, closed relay contact 54a, diode 65, and wire 66b. The respective relays 54 and 55 are latched in through their contacts in bypass of velocity switches 60 and 73, so that, when these switches drop out during subsequent locomotive movement, continued energization of magnet valve 56 will depend upon the supply of power via the normally open contact A of pressure switch 52.

As previously explained, energization of magnet valve interrupts venting of application pipe 67, thereby isolating brake pipe 3 from atmosphere.

Now, if the proper cut-out setting of selector valve 6 is changed, for any reason, during locomotive movement, control line 53 becomes depressurized and pressure switch 52 accordingly transitions to its normal condition, in which the normally open contacts of switch A interrupt the supply of power to wire 74 to thereby interrupt the supply of power to magnet valve 56 and relay 54 via wire 74a, relay contact 55a, diode 75, and the relay contact 54a. Thus, magnet valve 56 is deenergized to vent application pipe 67 and thereby cause exhaust relay 68 to exhaust the brake pipe pressure independently of brake valve device 1 to initiate an emergency brake application in response to improperly changing the setting of selector valve 6 during locomotive movement.

Transition of pressure switch 52 to its normal position, in response to the aforementioned setting of selector valve 6 being changed, also makes the normally closed contacts and breaks the normally open contacts of switch B. The normally closed contact B of pressure switch 52 connects power from wire 64 to the r-c timing network via wire 70. Consequently, for a period of approximately 3 seconds, during which time capacitor 72 is being charged via resistor 71, insufficient current is available via wire 64 to maintain relay 54 energized via diode 65 and wire 66a. This assures that a power interruption is established for a sufficient period of time to deenergize relay 54 and thus magnet valve 56, thereby allowing exhaust relay valve 68 to react to exhaust brake pipe pressure and invoke an emergency brake application, even in the event the transition of pressure switch 52 is so rapid as to nearly instantaneously transfer the supply of power from wire 74 to wire 64. Once relay contact 54a drops out, the latching circuit is no longer effective to hold in the relay. As mentioned, relative to operation of the brake assurance circuit in "lead" mode of operation, relay 54 can only be reenergized by closure of velocity switch 60, thus requiring that the locomotive come to a complete halt before the emergency brake application invoked by the brake assurance circuit 50 can be released.

Various indicators, such as a "power on" light 76, a "velocity zero" light 77, a "lead mode" light 78, and a "cut-out mode" light 79 are provided to signal the operator of critical locomotive operating conditions. Light 76 receives power from wire 59 at a point between on/off switch 57 and velocity switch 60; light 77 receives power from wire 62 at a point betgween velocity switch 60 and diode 61; light 78 receives power from wire 64 at a point between pressure switch 52 and the juncture of wire 74a therewith, and light 79 receives power from wire 74a.

In the event magnet valve 56 becomes deenergized as a result of a circuit malfunction, for example, it may be necessary to release the resultant brake application, but it would not be prudent to allow the locomotive to proceed without correcting the malfunction. Thus, a mechanically-operated cut-off valve 80 is disposed in application pipe 67 and is mechanically connected to a breaker switch 81 in a propulsion control wire 82. Operating cut-off valve 80, to interrupt the exhaust of air in application pipe 67, such as when it is desired to release the brakes when magnet valve 56 is found to be in a deenergized condition, due to a malfunction of circuit 50, causes breaker switch 81 to open propulsion control wire 82 and accordingly prevent the locomotive from being moved under power.

I claim:

1. A brake assurance circuit for a locomotive having a brake pipe (,brake control means operative) in which fluid under pressure is carried for controlling the brakes of a train in response to variations of fluid pressure effective in said brake pipe, a (locomotive) brake valve device via which said variation of said brake pipe fluid pressure is controlled, (flow control valve means via which said brake pipe fluid under pressure is supplied and exhausted under control of said brake valve device, and) selector valve means having a (normal) cut-in position (in which said flow control valve means is open) and a cut-out position (in which said flow control valve means is closed), and brake pipe cut-off valve means for connecting said brake pipe fluid under pressure to said brake valve device when said selector valve means is set in said cut-in position and for interrupting said connection when said selector valve means is set in said cut-out position, said brake assurance circuit comprising:

(a) a source of power;
(b) a first circuit to which said source of power is connected;
(c) a second circuit (to which said source of power is) connected in parallel with said first circuit, said second circuit having first and second branches in parallel via which said source of power is connected to said second circuit;

(d) exhaust means connected to said first and second circuits for exhausting the fluid under pressure in said brake pipe independently of said brake valve device when said exhausting means is deenergized;

(e) switch means for connecting current from said source of power to said second circuit via either one of said first (and) or second branches thereof depending upon said selector valve means being set in said cut-in or cut-out position; and (f) means for interrupting current in said first circuit and in the other of said first and second branches of said second circuit during said movement of said locomotive, whereby repositioning said selector valve means during said movement of said locomotive interrupts current in said one of said first and second branches to effect said deenergization of said exhausting means.

2. The circuit as recited in claim 1, wherein said interrupting means includes a first normally closed velocity switch in said first circuit that opens during said movement of said locomotive.

3. The circuit as recited in claim 2, wherein said switch means comprises a pressure switch having a first contact member engageable with a first set of contacts via which said source of power is connected to said first branch in said cut-in position of said selector valve means and engageable with a second set of contacts via which said source of power is connected to said second branch in said cut-out position of said selector valve means.

4. The circuit as recited in claim 3, wherein said first set of contacts are normally closed and said second set of contacts are normally open.

5. The circuit as recited in claim 4, wherein said interrupting means further includes:

(a) a first relay;

(b) a contact of said first relay in said first branch via which said first relay is latched in when said first velocity switch opens;

(c) a second relay;

(d) a second normally closed velocity switch via which said second relay is energized when said first contact member of said switch means engages said second set of contacts, said second velocity switch opening during said movement of said locomotive; and (e) a contact of said second relay in said second branch via which said second relay is latched in when said second velocity switch opens, provided said first contact member of said switch means is engaged with said second set of contacts.

6. The circuit as recited in claim 5, further comprising means for delaying energization of said first relay when said first contact member of said switch means is disengaged from said second set of contacts and engaged with said first set of contacts.

7. The circuit as recited in claim 6, wherein said delay means comprises an r-c timing circuit connected in parallel with said first relay.

8. The circuit as recited in claim 7, wherein said switch means further comprises a second contact member engageable with a third set of contacts in said cut-in position of said selector valve means and engageable with a fourth set of contacts in said cut-out position of said selector valve means.

9. The circuit as recited in claim 8, wherein said third set of contacts is normally closed and said fourth set of contacts is normally open.

10. The circuit as recited in claim 9, wherein said first branch is connected to said r-c timing circuit via one of said third and fourth sets of contacts.

11. The circuit as recited in claim 10, wherein said r-c timing circuit is short-circuited via the other of said third and fourth sets of contacts.

12. The circuit as recited in claim 5, wherein said first and second branches are interconnected at a point in said second circuit ahead of said first relay contact therein.

13. The circuit as recited in claim 12, further comprising means for preventing the flow of current from said first branch to said second branch.

14. The circuit as recited in claim 1, wherein said source of power is an electrical source.

15. The circuit as recited in claim 14, wherein said brake pipe exhausting means comprises:

(a) an application pipe normally charged with fluid under pressure;

(b) exhaust pilot valve means for connecting said brake pipe fluid under pressure to atmosphere in response to venting of said application pipe; and (c) a magnet valve device to which current is connected via said first and said circuits to normally maintain said magnet valve device energized, in which energized condition said application pipe is cut off from atmosphere.

16. The circuit as recited in claim 15, further comprising:

(a) means for controlling the locomotive propulsion;

(b) cut-off valve means in said application pipe in series with said magnet valve device for interrupting venting of said application pipe when said magnet valve device is deenergized; and (c) means for disabling said propulsion control means in response to said cut-off valve means interrupting venting of said application pipe.

* * * * *

UNITED STATES PATENT AND TRADEMARK OFFICE
CERTIFICATE OF CORRECTION

PATENT NO. : 4,830,437
DATED : May 16, 1989
INVENTOR(S) : Steven C. Rumsey

It is certified that error appears in the above-identified patent and that said Letters Patent is hereby corrected as shown below:

Column 6, line 45, delete "(, brake control means operative)"

line 48, delete "(locomotive)"

lines 50-53, delete "(flow control valve means via which said brake pipe fluid under pressure is supplied and exhausted under control of said brake valve device, and)"

line 53, delete "(normal)"

lines 54-55, delete "(in which said flow control valve means is open)"

lines 55-56, delete "(in which said flow control valve means is closed)"

line 66, delete "(to which said source of power is)"

Column 7, line 9, delete "(and)"

UNITED STATES PATENT AND TRADEMARK OFFICE
CERTIFICATE OF CORRECTION

PATENT NO. : 4,830,437

DATED : May 16, 1989

INVENTOR(S) : Steven C. Rumsey

It is certified that error appears in the above-identified patent and that said Letters Patent is hereby corrected as shown below:

Column 8, line 41, before "circuits" insert --second--.

Signed and Sealed this

Twenty-seventh Day of March, 1990

*Attest:*

JEFFREY M. SAMUELS

*Attesting Officer*      *Acting Commissioner of Patents and Trademarks*